United States Patent [19]

Tillman et al.

[11] Patent Number: 4,880,258
[45] Date of Patent: Nov. 14, 1989

[54] VACUUM CLEANER WAND RELEASE STRUCTURE

[75] Inventors: Ennis L. Tillman; James R. Caldwell, both of Danville, Ky.

[73] Assignee: Whirlpool Corporation, Benton Harbor, Mich.

[21] Appl. No.: 164,810

[22] Filed: Mar. 7, 1988

[51] Int. Cl.[4] .............................................. F16L 37/24
[52] U.S. Cl. .......................................... 285/7; 285/24; 285/119; 285/308; 285/319
[58] Field of Search ...................... 285/7, 24, 308, 119, 285/319, 320

[56] References Cited

U.S. PATENT DOCUMENTS

| | | | |
|---|---|---|---|
| 198,402 | 12/1877 | Marsden | |
| 2,064,397 | 12/1936 | White | 285/174 |
| 2,184,881 | 12/1939 | Martinet | 285/170 |
| 2,222,018 | 11/1940 | Bruce | 285/174 |
| 2,245,151 | 6/1941 | Martinet | 285/174 |
| 2,420,866 | 5/1947 | Coss | 285/174 |
| 2,444,888 | 7/1948 | Baumgardner | 285/173 |
| 2,516,907 | 8/1950 | Penfold | 285/174 |
| 2,799,518 | 7/1957 | Anderson et al. | 285/119 |
| 2,951,714 | 9/1960 | Carlberg | 285/7 |
| 3,212,795 | 10/1965 | Helm et al. | 285/7 |
| 3,245,698 | 4/1966 | Fromknecht | 285/71 |
| 3,259,934 | 7/1966 | Leinfelt | 15/373 |
| 3,309,113 | 3/1967 | Beach | 285/7 |
| 3,633,942 | 1/1972 | Meyerhoefer | 285/312 |
| 3,869,751 | 3/1975 | Boyd et al. | 15/334 |
| 3,870,491 | 3/1975 | Friesen et al. | 55/376 |
| 4,017,937 | 4/1977 | Hanold | 15/327 R |
| 4,211,438 | 7/1980 | Asberg | 285/7 |
| 4,385,790 | 5/1983 | Genoa | 339/16 R |
| 4,618,195 | 10/1986 | Keane | 339/16 R |
| 4,639,055 | 1/1987 | Keane | 339/16 R |

Primary Examiner—Dave W. Arola
Attorney, Agent, or Firm—Wood, Dalton, Phillips, Mason & Rowe

[57] ABSTRACT

A vacuum cleaner structure wherein a force transfer structure is provided for facilitated positioning of a locking post provided for resiliently releasably locking a pair of flow passage elements in the vacuum cleaner structure. The force transfer structure defines a large area for facilitated fingertip manipulation and indication to the user of the location of the locking structure. The force transfer structure may be selectively mounted to other structure carried by the flow passage element. In one form, the force transfer structure is mounted to the flow passage element by an annular collar and, in another form, the force transfer structure is mounted directly to the flow passage element by a securing element, such as a rivet.

20 Claims, 1 Drawing Sheet

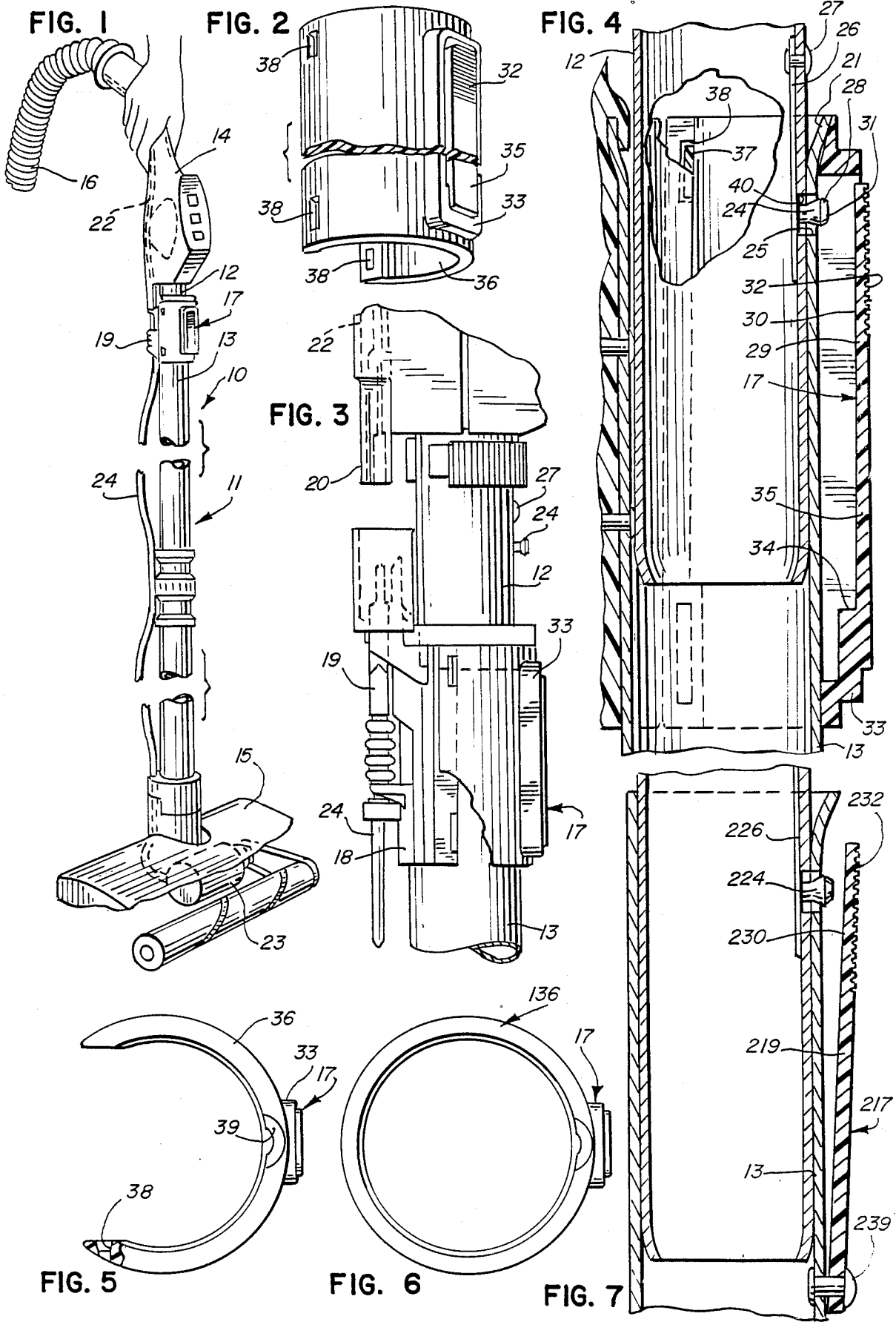

VACUUM CLEANER WAND RELEASE STRUCTURE

TECHNICAL FIELD

This invention relates to vacuum cleaner structures and in particular to means for releasably locking tubular vacuum cleaner wand elements in telescopic association.

BACKGROUND ART

One method of releasably locking telescopically associated wand elements in a vacuum cleaner is to provide a resiliently mounted locking post on the inner wand element end arranged to project outwardly through an opening in the outer wand element end when the wand elements are disposed in the desired telescopic relationship. The projection of the locking post through the opening in the outer wand end prevents coaxial withdrawal of the inner wand element from the outer wand element until such time as the user depresses the locking post to urge it inwardly through the opening in the outer wand end.

It is conventional to provide a tapered distal end of the locking post so that when the user presses the locking post inwardly, the inclined surface of the tapered end acts as a camming means to urge the locking post further inwardly as a function of the urging of the wand elements telescopically apart in the initiation of the withdrawal of the inner element from the outer element.

A problem arises in such quick release locking means for vacuum cleaner wands in that the locking post end is relatively small and difficult for some users of such vacuum cleaners to manipulate, thereby making the disassembly of the wand, as for storage purposes, difficult.

It is further known in such vacuum cleaner wand structures to provide means for supporting male or female electrical connector elements at the end of the tubular wand element for interconnection with a complementary electrical terminal element associated with the complementary tubular wand element. It is known to provide such an electrical connector mounting means in the form of a carrier embracing the end of the one wand element.

It is further known to provide dust covers and the like overlying the interlocking elements of such wand connectors so as to preclude dust-laden air flow outwardly through the interstices thereof. Where such dust covers are utilized, it is further common to form them of relatively deformable material to permit the actuation of the locking means through the dust cover with the dust cover in place.

DISCLOSURE OF INVENTION

The present invention comprehends an improved vacuum cleaner structure wherein means are provided for facilitating the release of the locking means by the user.

More specifically, the invention comprehends the provision of such means for releasing the locking means comprising a force transfer element having a relatively large transverse area movably disposed outwardly adjacent the locking element, whereby movement of the force transfer means against the locking element facilitates the repositioning of the locking element to the unlocking disposition.

In the illustrated embodiment, the force transfer means is mounted to the end of the wand element to which the electrical connector carrier is mounted. The force transfer means is removably secured to the carrier.

In one embodiment, the force transfer element is mounted to the wand end by a continuous annular support portion.

The force transfer element, in the illustrated embodiment, is received within an upstanding peripheral wall in cantilevered relationship to the locking post.

In a modified embodiment, the force transfer element is secured directly to the wand element, with the distal end thereof overlying the locking post.

The force transfer element is extremely simple and economical of construction, while yet providing an improved, facilitated release of the locking post in a vacuum cleaner wand structure. The force transfer element may be removably secured to existing structure of the wand elements for facilitated inclusion in existing vacuum cleaner structures.

BRIEF DESCRIPTION OF THE DRAWING

Other features and advantages of the invention will be apparent from the following description taken in connection with the accompanying drawing wherein:

FIG. 1 is a fragmentary perspective view of a vacuum cleaner structure embodying the invention;

FIG. 2 is a fragmentary perspective view of a force transfer element, of the invention;

FIG. 3 is a fragmentary side elevation of the structure of the invention, with the wand elements being disposed as during telescopic association thereof;

FIG. 4. is a fragmentary enlarged diametric section illustrating in greater detail the association of the force transfer means and locking post structure of the vacuum cleaner wand elements;

FIG. 5 is, an end elevation of the force transfer element of the invention;

FIG. 6 is an end elevation of a modified form of transfer element embodying the invention; and FIG. 7 is a fragmentary diametric section illustrating a further modified form of force transfer element embodying the invention.

BEST MODE FOR CARRYING OUT THE INVENTION

In the illustrative embodiment of the invention as disclosed in FIGS. 1-5 of the drawing, a vacuum cleaner structure generally designated 10 is shown to comprise a tubular wand generally designated 11, including an upper wand element 12 telescopically receivable in a lower wand element 13. The upper wand element may be provided with a handle 14 arranged to be grasped by a user in manipulating the vacuum cleaner structure, which further includes a nozzle 15 mounted to the lower end of the wand, and a suction hose 16 connecting the upper end of the tubular wand to a source of suction (not shown), such as a conventional canister.

The present invention is concerned with the releasable locking of the wand elements in telescopic association and, more specifically, is concerned with the provision of a force transfer structure generally designated 17 for facilitating the release of the telescopically associated wand elements, as shown in FIG. 1.

Lower wand element 13 may be provided with a carrier 18 arranged to removably support an electrical connector, such as male plug element 19, for automatic electrical connection to a complementary electrical connector, such as female plug element 20, fixedly associated with the upper wand element 12, as seen in FIG. 3. Thus, when the upper wand element 12 is fully telescopically inserted into the upper end 21 of the lower wand element 13, the electrical connector elements are automatically electrically interconnected for delivering power from a supply cord 22 connected to a power supply source (not shown) through the hose 16, and to electrical apparatus, such as brush motor 23 carried by the nozzle, through a cord 24 connected to the male connector element 19, as seen in FIG. 1.

As indicated briefly above, the telescopically associated wand elements 12 and 13 are locked in interconnected association by manually releasable locking means. In the illustrated embodiment, the locking means includes a locking post 24 which extends yieldably through an opening 25 in the upper end 21 of the lower wand element when the wand elements are in fully telescopically connected relationship, as seen in FIG. 4.

Locking post 24 is carried on a resilient support 26 secured to the upper wand element 12 as by a rivet 27, as shown in FIG. 4.

As further illustrated in FIG. 4, the distal upper end of the lower wand element 21 is outwardly flared adjacent opening 25 so as to guide the locking post inwardly against the biasing action of the resilient support 2 until the locking post becomes aligned with opening 25, whereupon the resilient support 26 urges the locking post to the locking disposition shown in FIG. 4.

In the conventional arrangement, the user must depress the distal end 28 of the locking post to urge it inwardly of the opening 25 in effecting withdrawal of the upper wand element 12 from the lower wand element 13 when it is desired to store the vacuum cleaner structure. As can be seen in FIG. 4, the arrangement of the locking post presents some difficulty in effecting the necessary repositioning of the locking post suitably to permit the desired separation of the wand elements. The present invention comprehends the provision of improved means for facilitating such repositioning of the locking post.

More specifically, the invention comprehends the provision of the force transfer structure 17 having a manually depressible portion 29 adapted to be urged against the distal end 28 of the locking post for urging the locking post inwardly through opening 25 sufficiently to permit the desired arrangement for permitting separation of the wand elements.

The invention comprehends the provision of the outer distal portion 28 of the locking post as a frustoconical portion, as seen in FIG. 4, whereby positioning thereof within the opening 25 permits subsequent withdrawal movement of the upper wand element relative to the lower wand element to cam the locking post further inwardly by the engagement of the frustoconical portion 28 with the edge of the opening 25. Thus, the force transfer element of the present invention is arranged to reposition the locking post outer portion 28 flush with the outer surface of the wand element 13 adjacent opening 25, permitting the camming functioning to complete the inward movement of the post to effect the unlocking of the wand elements.

More specifically, the force transfer element portion 29 defines a substantially planar inner surface 30 adapted to engage the outer face 31 of the locking post distal end 28. The outer surface 32 of the depressible portion 29 may be striated, as seen in FIG. 4, for facilitated fingertip manipulation thereof.

In the embodiment of FIGS. 1–5, the force transfer structure includes a upstanding peripheral wall 33 defining a recess 34 at least partially receiving the force transfer element, as illustrated in FIG. 4. The force transfer element includes a connecting portion 35 connected to the wall 23 for supporting the force transfer element in a cantilevered arrangement therefrom, as seen in FIG. 4. The force transfer element is preferably formed of a resilient material, such as synthetic resin, for facilitated resilient manipulation thereof from the normal position of FIG. 4 into engagement with the locking post to effect the above described unlocking operation.

Force transfer structure 17 further includes a mounting portion 36 comprising a segmentally tubular carrier adapted to embrace the end of wand 13 adjacent opening 25. Electrical connector carrier 18, in the illustrated embodiment, is provided with a plurality of upstanding lugs 37 adapted to be received in complementary openings 38 in the distal end of the carrier 36, as seen in FIGS. 4 and 5. Thus, the force transfer structure may be readily removably mounted to the wand end to dispose the force transfer portion 29 in alignment with the locking post 24 and opening 25.

As further shown in FIG. 5, mounting portion 36 may be provided with a flared portion 39 accommodating the flared portion 21 of the wand end 13, as further illustrated in FIG. 4.

The invention further comprehends the provision of a modified form of mounting portion generally designated 136 comprising a full tubular mounting portion adapted to encircle the lower wand end where the lower wand end is not provided with the complementary electrical connector carrier. The structure of FIG. 6 is, in all other respects, similar to the structure of FIGS. 1–5.

Still another modified form of the invention is illustrated in FIG. 7 wherein the force transfer structure generally designated 217 is shown to comprise a manually depressible portion 219 directly connected to the lower wand element 13 by a suitable rivet 239. The resiliency of the force transfer structure is such as to permit the locking post 224 to be biased to the locking position by the resilient support 226 and repositioned in the unlocking arrangement only by suitable manipulation of the force transfer element. The structure of the embodiment of FIG. 7 is similar to the structure of the embodiment of FIGS. 1–5 in all other respects and functions in a similar manner in effecting the facilitated release of the telescopically locked wand elements.

The invention comprehends broadly the provision in a vacuum cleaner structure of first and second telescopically connected flow passage elements with cooperating releasable locking means on the elements, including a resiliently biased locking element having a manually depressible portion defining a preselected small fingertip engagement area. The invention comprehends providing force transfer means mounted to at least one of the vacuum cleaner telescopically connected elements and having a movable portion overlying the manually depressible portion of the locking means. The movable portion of the force transfer means has an area substantially greater than the preselected fingertip engagement area of the locking element and defines means for transferring actuating force from a user's fingertip to the locking element for releasing the locking means in a facilitated manner.

The structure further includes means for accurately locating the force transfer means in alignment with the locking element and may include means associated with other structure previously mounted to the wand element for providing facilitated releasable mounting thereof to the wand element. The invention comprehends different methods of mounting the force transfer element to the wand element and a number of exemplary structures for this purpose are illustrated.

The invention comprehends partially recessing the force transfer means within a peripheral wall structure to avoid undesirable accidental release of the connected wand elements.

By virtue of the relatively large area of the force transfer means, the location of the locking means is readily observable by the user in addition to be readily operable in providing facilitated locking of the wand elements. The force transfer element is biased to be disengaged relative to the locking post until such time as the user intentionally operates the force transfer means to effect the desired unlocking of the locking means.

More specifically, the invention comprehends the provision of such a vacuum cleaner structure including a first wand element 12 having a through opening 40, a flat spring member 26 having one end permanently affixed to the first wand element, as by rivet 27, to extend to adjacent the through opening 40. The flat spring member has a distal end freely movable radially within the first wand element and carries a lock member 24 having a relieved outer portion 28. The lock member is secured to the free end of the flat spring member. A second wand element includes an end for interiorly receiving the first wand element and is provided with a through opening 25 aligned with the opening 40 of the first wand element for receiving the locking element 24.

A detachable collar 36 is disposed on the lower wand element and extends at least 180°. In one form, the collar is releasably secured to an electrical connector carrier 18 mounted to the wand element 13. A rectangular boss is provided on the collar to define a space outwardly aligned with the wand element openings and a resilient rectangular lever arm 29 is connected to the boss in a cantilevered arrangement, whereby depression of the lever arm effects disengagement of the wand lock member from the second wand element for slidable removal of the first wand element from the second wand element when desired.

The foregoing disclosure of specific embodiments is illustrative of the broad inventive concepts comprehended by the invention.

We claim:

1. In a vacuum cleaner structure having first and second telescopically connectible flow passage elements, the improvement comprising:
   cooperating releasable locking means on said flow passage elements to lock said elements in telescopic relationship including a resiliently biased lock element mounted to one of said flow passage elements including a manually depressible portion having a preselected small fingertip engagement area; and
   force transfer means mounted to the other of said elements and having a movable portion overlying said manually depressible portion of said locking means, said movable portion having an area substantially greater than said preselected fingertip engagement area of the locking element and defining means for transferring actuating force from a user's fingertip to said locking element for releasing said locking means.

2. The vacuum cleaner structure of claim 1 further including means for accurately locating the force transfer means in alignment with said fingertip engagement area of the locking element.

3. The vacuum cleaner structure of claim 1 further including means for accurately locating the force transfer means in alignment with said fingertip engagement area of the locking element including a mounting portion embracing a portion of the other of said flow passage elements.

4. The vacuum cleaner structure of claim 1 where said force transfer means further comprises means for biasing said movable portion away from said depressible portion of the locking means.

5. The vacuum cleaner structure of claim 1 wherein said force transfer means is removably mounted to the other of said elements.

6. The vacuum cleaner structure of claim 1 wherein said movable portion of the force transfer means is spaced outwardly from said locking element.

7. The vacuum cleaner structure of claim 1 further including a support wall mounted to said other of said elements and having an opening therethrough, aid force transfer means being received at least partially in said opening.

8. In a vacuum cleaner structure having a wand including first and second telescopically connectible tubular elements, the improvement comprising:
   means defining a through opening in said first element;
   a locking post defining an outer distal end having a preselected small fingertip engagement area;
   mounting means for resiliently mounting said locking post to said second element and biasing said locking post to a locking position wherein said locking post projects outwardly through said opening as a result of the telescoping reception of said second element coaxially in said first element to dispose said locking post in alignment with said opening; and
   force transfer means mounted to said first element and having a movable portion overlying said opening for engaging said outwardly disposed distal end of the locking post and having an area substantially greater than said preselected area of said distal end and defining means for transferring force from a user's fingertip to urge said projecting distal end inwardly to within said opening, said locking post locking said second element against coaxial withdrawal from said first element when said locking post is disposed in said locking position, said locking post being urged to a release position inwardly of said locking position permitting coaxial withdrawal of said second element from said first element as a result of urging of said locking post inwardly by said force transfer means.

9. The vacuum cleaner structure of claim 8 wherein said force transfer means comprises a segmentally tubular support embracing said first wand element adjacent said opening 10. The vacuum cleaner structure of claim 8 wherein said force transfer means comprises a segmentally tubular support and means for removably securing said support coaxially to said first wand element.

11. The vacuum cleaner structure of claim 8 wherein a power-plug carrier is provided in said first wand element and said force transfer means is removably secured to said power-plug carrier.

12. The vacuum cleaner structure of claim 8 wherein a power-plug carrier is provided in said first wand element and said force transfer means comprises a unitarily integral extension of said carrier.

13. The vacuum cleaner structure of claim 8 wherein said force transfer means comprises an outwardly projecting, wall defining an opening, said force transfer means movable portion being mounted to said wall to extend across said wall opening.

14. In a vacuum cleaner structure having a wand including first and second telescopically connectible tubular elements, the improvement comprising:
   means defining a through opening in said first element; a locking post defining an outer distal end tapered outwardly and having a preselected small fingertip engagement area;
   mounting means for resiliently mounting said locking post to said second element and biasing said locking post to a locking position wherein said locking post projects outwardly through said opening as a result of the telescoping reception of said second element coaxially in said first element to dispose said locking post in alignment with said opening; and
   force transfer means mounted to said first element and having a movable portion overlying said opening and having an inner surface having a transverse extent greater than that of said opening and defining means for engaging said outwardly disposed distal end of the locking post, said force transfer means further defining an outer surface having an area substantially greater than said preselected area of said distal end and defining means for transferring force from a user's fingertip to urge said inner surface against said projecting distal end and resultingly urge said distal end inwardly to within said opening, said locking post locking said second element against coaxial withdrawal from said first element when said locking post is disposed in said locking position, said locking post being urged to a release position inwardly of said locking position permitting coaxial withdrawal of said second element from said first element as a result of urging of said locking post inwardly by said force transfer means to dispose said tapered distal end within said opening and permit coaxial movement of said second wand element relative to said first wand element to cause said first wand element means defining said opening to cam said tapered distal end inwardly of said first wand element and thereby permit withdrawal of said second wand element from said first wand element.

15. The vacuum cleaner structure of claim 14 wherein said tapered distal end defines an outwardly narrowing frustoconical camming surface.

16. The vacuum cleaner structure of claim 14 wherein said inner surface of the force transfer means comprises a flat surface.

17. The vacuum cleaner structure of claim 14 wherein said tapered distal end defines an outwardly narrowing frustoconical camming surface having an axial extent at least equal to the radial thickness of said means defining said opening.

18. The vacuum cleaner structure of claim 14 wherein said inner surface of the force transfer means comprises a flat surface and said means defining said opening comprises means defining an opening having right-circularly cylindrical sidewalls.

19. The vacuum cleaner structure of claim 14 wherein a power-plug carrier is provided in said first wand element and said mounting means is removably secured to said power-plug carrier.

20. Vacuum cleaner structure comprising:
   a first wand element having a through opening spaced from one end;
   a flat spring member having one end permanently affixed to said first wand element adjacent said through opening, said flat spring member having one end freely movable radially within said first wand element with a portion of said free end disengageably covering said through opening;
   a wand lock member having a relieved outer portion for releasably contacting a wand element end, said wand lock member being permanently affixed to said free end of said flat spring member and projecting radially outward through said through opening;
   a second wand element having an end for interiorly receiving said first wand element, said receiving end having a through opening for receiving said wand lock member;
   a detachable collar disposed over said receiving end and radially covering at least half the circumference of said receiving end;
   a longitudinal outwardly extending rectangular boss centrally located on said collar having an interior space extending over said through opening in said second wand section; and
   a resilient rectangular lever arm having one end permanently attached to the upper portion of said boss with a free end longitudinally extending over said interior space or releasably contacting said wand lock member by radial inward movement, whereby said wand lock member disengages said second wand element for slidable removal of said first wand element from said second wand element.

* * * * *